Patented Oct. 14, 1947

2,428,785

UNITED STATES PATENT OFFICE 2,428,785

CEMENT COMPOSITION AND METHOD OF PRODUCING

Lewis H. Colvin, Indianapolis, Ind., assignor to Wayne B. Colvin and Cleon Colvin, both of New York, N. Y.

No Drawing. Application August 19, 1944, Serial No. 550,319

9 Claims. (Cl. 106—89)

1

The object of my invention is to provide a novel composition of matter which, when mixed with water and brush-applied to surfaces of Portland concrete or other similar surfaces, will seal such surfaces against the passage of water in either direction.

My invention resides in the new composition of matter and in the method of producing it.

To one part, by volume, of chromic acid crystals, such as are commonly used in electrolytic baths for chrome plating, I add 1½ to 2½ parts, by volume, of pumicite of the character of commercially obtainable pumicite found in the vicinity of Meade, Kansas.

An analysis of a sample of such pumicite shows the following ingredients and characteristics:

| | Per cent |
|---|---|
| Moisture (volatile at 212 degrees F.) | None found |
| Silica | 69.80 |
| Iron calculated to ferric oxide ($Fe_2O_3$) | 1.58 |
| Aluminum oxide | 13.72 |
| Titanium oxide | 0.12 |
| Calcium oxide | 1.80 |
| Magnesium oxide | 0.21 |
| Potassium oxide | 5.66 |
| Sodium oxide | 2.54 |
| Carbon dioxide | None found |
| Sulphur trioxide | None found |
| Chlorine | Trace |
| Loss on ignition | 4.50 |
| | 99.93 |
| Soluble in water at 70 degrees F | 0.024 |
| Soluble in water at 212 degrees F | 0.16 |

These two ingredients are ground together to a very fine powder and heated in a suitable crucible until the mixture turns black. So far as my experiments have gone, an odor like that of heated sulphur is given off during this heating operation and heating should be continued until production of this odor ceases. My experience also indicates the necessity of use of a non-metallic crucible for this heating operation in order to avoid explosion.

While hot, the above residue is readily friable and is reground to a fine powder. Regrinding when cold may be accomplished but is much more difficult. For convenience this reground mixture will be hereafter referred to as mixture A.

To mixture A (2.5 to 3.5 volumes), I add 1 to 2 volumes of metallic aluminum such as is commonly used in producing aluminum paint. After thorough mixing (A and aluminum), I heat slowly in a non-metallic crucible to a yellow heat.

2

I then locally apply the tip of a blow torch flame until the mixture takes fire locally, whereupon the blow torch flame should be withdrawn, combustion propagating in the mixture until it turns black. Local application of flame, as described above, may be omitted if the whole mass is crucible heated until it turns black but this requires a greater expenditure of heat. However, my experience indicates that initial heating to yellow heat must be accomplished slowly, in order to avoid explosion, and that heating beyond the yellow heat must be more rapid to obtain proper unification of the ingredients. For that reason, the method of local ignition at the yellow stage is recommended. For instance, I have obtained successful results by applying heat to about one teaspoonful of such a mixture of mixture A and aluminum at such rate that the yellow stage was reached in from 15 to 30 minutes, whereas if heat were applied at such rate to such an amount as to raise it to the yellow stage in 5 minutes, explosion occurred.

Combustion in this mixture produces a bright yellow glow until the mixture finally turns black. This residue, while still hot, is quite friable and is finely ground to powder—conveniently about 200 mesh. For convenience, the above powder will be referred to as mixture B.

Mixture B (⅝ lbs. to 2 lbs.) is mechanically mixed with Portland cement 94 lbs. to produce a stable, commercially marketable mixture C.

When sufficient water is added to mixture C a brushable paste is produced which, when applied to surfaces of Portland cement concrete, quickly hardens, with a glossy surface and forms a highly efficient seal against the passage of water to or from the body of the concrete.

The surface of the concrete should be preliminarily thoroughly dampened in order to obtain the best results.

Ordinary pigments, commonly used in paints, may be added to mixture C to obtain desired colors.

The chromic acid and pumicite may be individually powdered and then mixed, but I have found that the presence of pumicite with the acid during the grinding appears to facilitate the reduction to the desired powder.

The presence of the pumicite with the chromic acid and aluminum during grinding inhibits explosions.

If the chromic acid and pumicite are not heated together the final mixture C will not set.

I have found it advisable to apply the blow torch flame upon a relatively small area of the heated mixture, A plus aluminum, in order to avoid mushing the entire mixture.

For some reason not known to me, some pumicites (such, for instance, as those originating in northern Nebraska) are not available for my product, as the end results are not satisfactory.

I claim as my invention:

1. A composition of matter comprising the residue of a mixture of chromic acid and pumicite having the characteristics of that originating near Meade, Kansas, and described in the above specification, heated until black.

2. A composition of matter comprising the residue of a mixture of chromic acid and pumicite having the characteristics of that originating near Meade, Kansas, and described in the above specification, in the approximate proportions of 1 vol. chromic acid, 1½ to 2½ vol. pumicite heated until black.

3. A composition of matter comprising the residue of a mixture of chromic acid and pumicite having the characteristics of that originating near Meade, Kansas, and described in the above specification, heated until black and ground to a fine powder.

4. A composition of matter comprising the residue of a mixture of chromic acid and pumicite having the characteristics of that originating near Meade, Kansas, and described in the above specification, in the approximate proportions of 1 vol. chromic acid, 1½ to 2½ vol. pumicite heated until black and ground to a fine powder.

5. A composition of matter comprising a powder formed of the residue of chromic acid and pumicite having the characteristics of that originating near Meade, Kansas, and described in the above specification, in the approximate proportions of 1 vol. chromic acid, 1½ to 2½ vol. pumicite heated until black (mixture A), and metallic aluminum in the proportions 2½ to 3½ vol. mixture A, 1 to 2 vol. aluminum, heated together until black.

6. A composition of matter comprising a mixture of the composition of claim 5 and Portland cement in the approximate portions ⅝ to 2 lbs. mixture B, 94 lbs. Portland cement.

7. The method of producing a water proofing composition which involves the step of heating together in a non-metallic container, a mixture of chromic acid and pumicite having the characteristics of that originating near Meade, Kansas, and described in the above specification, until black, the step of reducing said black mixture to powder, the step of mixing said powder with finely divided aluminum, and the step of reducing said last-named mixture by heat to a black residue.

8. The method of producing a water proofing composition which involves the step of heating together in a non-metallic container, a mixture of chromic acid and pumicite having the characteristics of that originating near Meade, Kansas, and described in the above specification, until black, the step of reducing the black residue to powder, the step of mixing said powder with finely divided aluminum in the approximate proportions 2½ to 3½ vol. black powder, 1 to 2 vols. aluminum, and the step of reducing said last-named mixture by heat to a black residue.

9. The method of producing a water proofing composition which involves the step of heating together in a non-metallic container, a mixture of chromic acid and pumicite having the characteristics of that originating near Meade, Kansas, and described in the above specification, until black, the step of reducing the black residue to powder, the step of mixing said powder with finely divided aluminum in the approximate proportions 2½ to 3½ vol. black powder, 1 to 2 vols. aluminum, the step of reducing said last-named mixture by heat to a black residue, the step of reducing the last-named black residue to powder, the step of mixing said last-named powder with Portland cement in the approximate proportions ⅝ pound to 2 pounds powder, 94 pounds cement, and the step of mixing water with said last-named mixture to produce a brushable paste.

LEWIS H. COLVIN.

REFERENCES CITED

The following references are of record in the file of this patent:

UNITED STATES PATENTS

| Number | Name | Date |
|---|---|---|
| 1,782,460 | Carlson | Nov. 25, 1930 |
| 2,061,972 | Reed-Lewis | Nov. 24, 1936 |
| 1,800,024 | Marczinczek | Apr. 7, 1931 |
| 1,944,820 | Beghelli | Jan. 23, 1934 |
| 1,951,186 | DeBow | Mar. 13, 1934 |

FOREIGN PATENTS

| Number | Country | Date |
|---|---|---|
| 306,444 | Great Britain | 1929 |